United States Patent
Rice et al.

(10) Patent No.: US 11,169,547 B2
(45) Date of Patent: Nov. 9, 2021

(54) GAS-PULSING-BASED SHARED PRECURSOR DISTRIBUTION SYSTEM AND METHODS OF USE

(71) Applicant: Applied Materials, Inc., Santa Clara, CA (US)

(72) Inventors: Michael Rice, Pleasanton, CA (US); Joseph AuBuchon, San Jose, CA (US); Sanjeev Baluja, Campbell, CA (US); Ashley M. Okada, San Jose, CA (US); Alexander Fernandez, San Francisco, CA (US); Ming Xu, San Jose, CA (US); Marcel E. Josephson, San Jose, CA (US); Sushant Suresh Koshti, Sunnyvale, CA (US); Kenneth Le, Fremont, CA (US); Kevin M. Brashear, San Jose, CA (US)

(73) Assignee: APPLIED MATERIALS, INC., Santa Clara, CA (US)

(*) Notice: Subject to any disclaimer, the term of this patent is extended or adjusted under 35 U.S.C. 154(b) by 0 days.

(21) Appl. No.: 16/396,684

(22) Filed: Apr. 27, 2019

(65) Prior Publication Data

US 2019/0332129 A1    Oct. 31, 2019

Related U.S. Application Data

(60) Provisional application No. 62/664,154, filed on Apr. 28, 2018.

(51) Int. Cl.
*G05D 7/06* (2006.01)
*G01F 25/00* (2006.01)

(52) U.S. Cl.
CPC ........... *G05D 7/0652* (2013.01); *G01F 25/00* (2013.01); *G01F 25/0038* (2013.01)

(58) Field of Classification Search
CPC ............................ G05D 7/0652; G05D 7/0664
See application file for complete search history.

(56) References Cited

U.S. PATENT DOCUMENTS

| | | | |
|---|---|---|---|
| 6,752,166 B2 * | 6/2004 | Lull | G05D 7/0664 118/715 |
| 7,666,773 B2 | 2/2010 | Huotari et al. | |
| 7,673,645 B2 * | 3/2010 | Ding | G05D 11/132 137/9 |
| 7,918,238 B2 * | 4/2011 | Tanaka | G01F 25/0038 137/10 |
| 9,638,560 B2 * | 5/2017 | Nagase | G01F 1/34 |
| 2002/0195056 A1 | 12/2002 | Sandhu et al. | |
| 2007/0215036 A1 | 9/2007 | Park et al. | |

(Continued)

OTHER PUBLICATIONS

PCT International Search Report and Written Opinion in PCT/US2019/029282 dated Sep. 19, 2019, 11 pages.

*Primary Examiner* — Michael R Reid
(74) *Attorney, Agent, or Firm* — Servilla Whitney LLC

(57) ABSTRACT

Gas distribution apparatus to provide uniform flows of gases from a single source to multiple processing chambers are described. A regulator is positioned at an upstream end of a shared volume having a plurality of downstream ends. A flow controller is positioned at each downstream end of the shared volume, the flow controller comprising an orifice and a fast pulsing valve. Methods of using the gas distribution apparatus and calibrating the flow controllers are also described.

18 Claims, 3 Drawing Sheets

(56) References Cited

U.S. PATENT DOCUMENTS

| | | |
|---|---|---|
| 2011/0033638 A1 | 2/2011 | Ponnekanti et al. |
| 2012/0269968 A1 | 10/2012 | Rayner, Jr. |
| 2014/0060430 A1 | 3/2014 | Oosterlaken et al. |
| 2015/0267297 A1 | 9/2015 | Shiba |
| 2015/0299848 A1 | 10/2015 | Haukka et al. |
| 2017/0306493 A1 | 10/2017 | Raj et al. |
| 2017/0342562 A1 | 11/2017 | Lind et al. |
| 2018/0108587 A1 | 4/2018 | Jiang et al. |
| 2019/0258279 A1* | 8/2019 | Penley .................. H04W 64/00 |

* cited by examiner

GAS-PULSING-BASED SHARED PRECURSOR DISTRIBUTION SYSTEM AND METHODS OF USE

CROSS-REFERENCE TO RELATED APPLICATIONS

This application claims priority to U.S. Provisional Application No. 62/664,154, filed Apr. 28, 2018, the entire disclosure of which is hereby incorporated by reference herein.

FIELD

Embodiments of the disclosure generally relate to gas distribution apparatus. More particularly, embodiments of the disclosure relate to apparatus to distribute gas to multiple processing chambers using pulsing gas flows.

BACKGROUND

Semiconductor device formation is commonly conducted in substrate processing platforms containing multiple chambers. In some instances, the purpose of a multi-chamber processing platform or cluster tool is to perform two or more processes on a substrate sequentially in a controlled environment. In other instances, however, a multiple chamber processing platform may only perform a single processing step on substrates; the additional chambers are intended to maximize the rate at which substrates are processed by the platform. In the latter case, the process performed on substrates is typically a batch process, wherein a relatively large number of substrates, e.g. 25 or 50, are processed in a given chamber simultaneously. Batch processing is especially beneficial for processes that are too time-consuming to be performed on individual substrates in an economically viable manner, such as for atomic layer deposition (ALD) processes and some chemical vapor deposition (CVD) processes.

During processing, expensive precursor gases are frequently wasted by being diverted to the foreline when not in use. Additionally, delivery hardware for providing precursor flows is expensive and often requires a dedicated gas stick for delivering a precursor to each and every wafer processing station.

Accordingly, there is a need in the art for apparatus and methods to uniformly and relatively inexpensively deliver gases to multiple processing chamber or process regions.

SUMMARY

One or more embodiments of the disclosure are directed to gas distribution apparatus comprising a shared volume having an upstream end and a plurality of downstream ends. A pressure gauge is connected to the shared volume. A pressure controller is connected to the upstream end of the shared volume. A flow controller is at each of the downstream ends of the shared volume. Each flow controller comprises an orifice and a fast pulsing valve.

Additional embodiments of the disclosure are directed to methods of calibrating a flow controller comprising a fast pulsing valve and an orifice. The methods comprise opening a pressure controller at an upstream end of a shared volume to pressurize the shared volume. The shared volume has an upstream end and a plurality of downstream ends and each downstream end has a flow controller. The pressure controller at the upstream end is closed to isolate the pressure in the shared volume. The pressure in the shared volume is measured. A fast pulsing valve of one flow controller is opened a predetermined number of times and the pressure in the shared volume is measured after opening the fast pulsing valve. The pressure loss in the shared volume per pulse of the fast pulsing valve is determined for that flow controller.

BRIEF DESCRIPTION OF THE DRAWINGS

So that the manner in which the above recited features of embodiments of the disclosure can be understood in detail, a more particular description of embodiments of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the disclosure provide a substrate processing system for continuous substrate deposition to maximize throughput and improve processing efficiency. One or more embodiments of the disclosure are described with respect to a spatial atomic layer deposition chamber.

Embodiments of the disclosure provide a new way of distributing precursors to multiple stations within a wafer processing chamber, and to multiple chambers within a cluster tool for atomic layer deposition (ALD) applications. A shared volume is advantageously used for a single precursor distribution to a whole cluster tool or multiple gas outlets of a batch processing chamber. Some embodiments advantageously provide gas pulsing technology to ensure accurate and repeatable/reproducible precursor delivery to all the stations of all the chambers within a cluster tool without any waste of expensive precursors.

Some embodiments of the disclosure advantageously provide apparatus and methods to minimize wasting of expensive precursors due to diverting precursor to foreline when not in use. Some embodiments advantageously provide apparatus and methods that minimize high precursor-delivery hardware costs due to using a dedicated gas stick for delivering a precursor to each and every wafer processing station of an ALD chamber.

Figure 1:
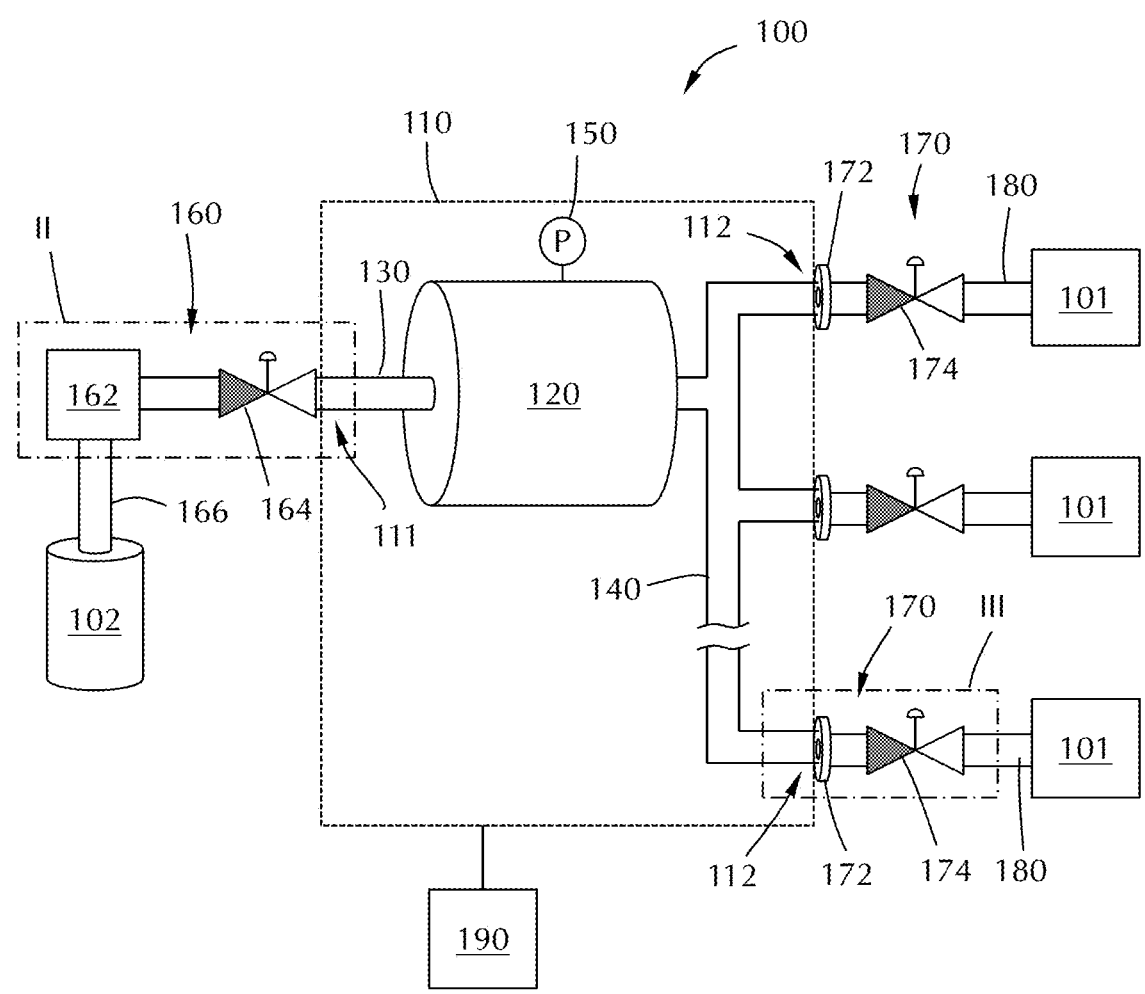
FIG. 1 shows a schematic representation of a gas distribution apparatus in accordance with one or more embodiments of the disclosure.

FIG. 1 shows an exemplary embodiment of the disclosure. A gas distribution apparatus 100 comprising a shared volume 110 to distribute gases to multiple processing stations 101. The use of the term "processing stations" refers to any chamber or process region of a chamber. For example, the processing stations 101 can be separate processing chambers or can be separate process regions of a single batch processing chamber. While FIG. 1 is illustrated with three processing stations 101, the skilled artisan will recognize that more or less than three processing stations 101 can be connected to the apparatus gas distribution apparatus 100.

The shared volume 110 has an upstream end 111 and a plurality of downstream ends 112. The shared volume 110 of some embodiments, as shown in the Figures, includes one or more of a gas reservoir 120 or distribution lines. In some embodiments, the shared volume 110 includes an upstream distribution line 130 from the upstream end 111 of the shared volume 110 to the gas reservoir 120. In some embodiments, the shared volume 110 includes a downstream distribution line 140 from the gas reservoir 120 to the plurality of downstream ends 112.

A pressure gauge 150 can be connected to the shared volume 110 to measure the pressure between the upstream end 111 and the plurality of downstream ends 112. The pressure gauge 150 can be positioned at any point between the upstream end 111 and the downstream ends 112. In some embodiments, the pressure gauge 150 is configured to measure the pressure in the gas reservoir. In some embodiments, there is more than one pressure gauge configured to measure pressure at different points of the shared volume 110.

Figure 2:
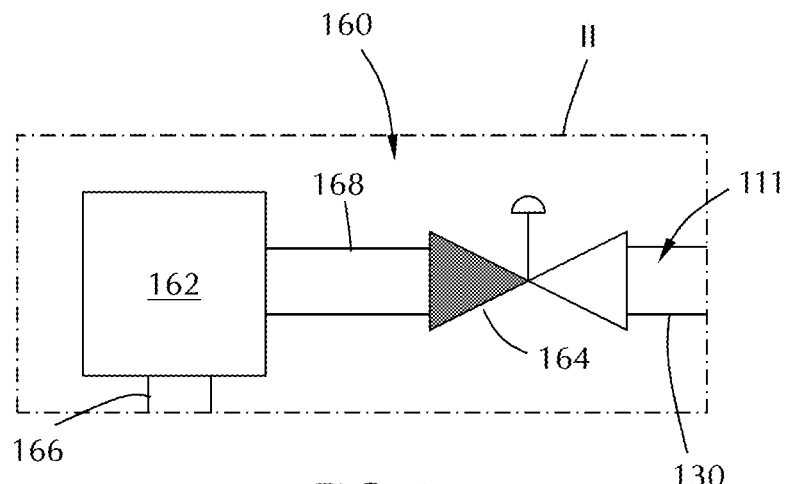
FIG. 2 shows an expanded view of region II of FIG. 1.

A pressure controller 160 is connected to the upstream end 111 of the shared volume 110. As used in this manner, when a gas flow component is connected to another gas flow component, there is fluid communication between the components so that there is substantially no interference with the gas flow. As shown in the expanded view of region II in FIG. 2, the pressure controller of some embodiments comprises one or more of a regulator 162 or a mass flow controller. The regulator 162 or mass flow controller can be any suitable gas regulator or mass flow controller known to the skilled artisan. The regulator provides a supply pressure (or input pressure) to the shared volume 110. The regulator 162 can be any mechanical or electrically controlled proportional pressure control component.

In some embodiments, the pressure controller 160 includes a fast pulsing valve 164. The fast pulsing valve 164 can be positioned between the regulator 162 and the upstream end 111 of the shared volume 110. In some embodiments, the fast pulsing valve 164 is upstream of the regulator 162. The fast pulsing valve 164 can be any valve that can open and/or close within 50 milliseconds. In some embodiments, the fast pulsing valve 164 can open and/or close within 40 milliseconds, 30 milliseconds, 20 milliseconds or 10 milliseconds. In some embodiments, the fast pulsing valve 164 can open and close within 50, 40, 30, 20 or 10 milliseconds. In some embodiments, the fast pulsing valve 164 is a valve that is either fully open or fully closed. In some embodiments, the fast pulsing valve 164 is a variable open valve that can allow modulation of the flow profile through the valve.

In FIG. 1, a gas source 102 is connected to the regulator 162 through inlet line 166. The regulator 162 is spaced from the fast pulsing valve 164 by pressure controller conduit 168. The length and/or volume of the pressure control conduit 168 can be any suitable length and/or volume, respectively. In some embodiments, the length and/or volume of the pressure control conduit 168 is minimized so that the fast pulsing valve 164 is in contact with the regulator 162.

Figure 3:
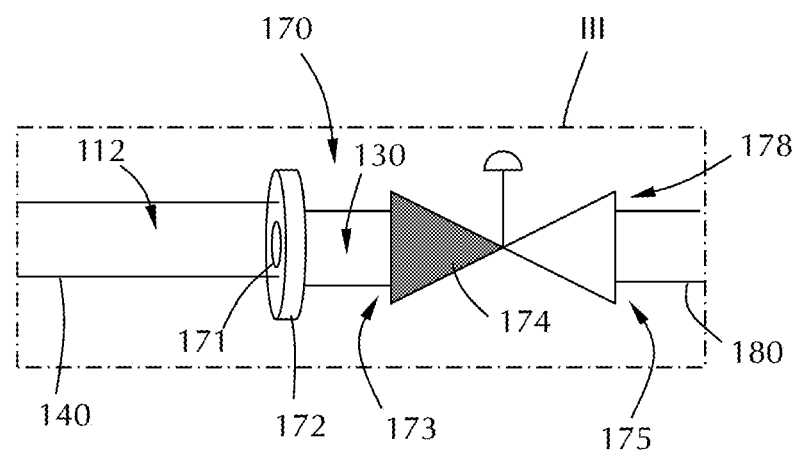
FIG. 3 shows an expanded view of region III of FIG. 1.

Referring to FIG. 1 and FIG. 3, the gas distribution apparatus 100 includes a flow controller 170 at each of the downstream ends 112 of the shared volume 110. FIG. 3 shows an expanded view of region III of FIG. 1. Each flow controller 170 includes an orifice 172 and a fast pulsing valve 174. The orifice 172 can be upstream of the fast pulsing valve 174, as shown in the Figures. In some embodiments, the orifice 172 is downstream of the fast pulsing valve 174.

The orifice 172 is in fluid communication with the fast pulsing valve 174 through flow control conduit 176. The volume of the flow control conduit 176 can be any suitable volume. In some embodiments, the volume between the orifice 172 and the fast pulsing valve 174 is minimized so that the orifice 172 and fast pulsing valve 174 are in contact. In some embodiments, the orifice 172 is at or within the inlet end 173 of the fast pulsing valve 174. In some embodiments, the orifice 172 is at or within the outlet end 175 of the fast pulsing valve 174.

The orifice 172 of some embodiments is a disk-shaped component with a precise aperture 171 extending therethrough. The orifice 172 acts as a restrictor in the flow path. In some embodiments, the gas distribution apparatus 100 includes a downstream gas conduit 180 connected to and in fluid communication with the downstream end 178 of each flow controller 170. The flow rate of gas exiting any of the flow controllers into the downstream gas conduit 180 is a function of the difference in pressure downstream of the orifice in the downstream gas conduit from the pressure upstream of the orifice.

In some embodiments, the pressure upstream of the orifices 172 in each of the flow controllers 170 is substantially the same. As used in this manner, the term "substantially the same" means that the pressure immediately before the orifices 172 are within 5%, 4%, 3%, 2% or 1% relative to the average pressure at all orifices 172.

The shared volume 110 of some embodiments is sufficiently large so that pressure perturbations in each downstream gas conduit 180 is less than ±5%, ±4%, ±3%, ±2% or ±1% relative to the average pressure.

Some embodiments of the disclosure are directed to methods of calibrating a flow control 170 comprising a fast pulsing valve 174 and an orifice 172. The pressure controller 160 is opened at the upstream end 111 of the shared volume 110 to pressurize the shared volume 110. Opening the pressure controller 160 can include openings the regulator and/or openings the fast pulsing valve 164. During pressurization, each of the flow controllers 170 is closed. After pressurizing the shared volume 110, the pressure controller 160 is closed to isolate the shared volume.

The pressure of the shared volume 110 can be monitored with the pressure controller 160 and flow controller 170 closed while the shared volume 110 is pressurized. A drift in the pressure measured using the pressure gauge 150 can indicate a leak in the system.

The pressure in the shared volume 110 is measured as an initial pressure. One of the fast pulsing valves 174 of one of the flow controllers 170 is opened and closed a predetermined number of times and the final pressure of the shared volume is measured. The difference in the final pressure relative to the initial pressure divided by the number of times that the valve was pulsed gives a pressure loss per pulse of that fast pulsing valve 174.

This process can be repeated for each of the flow controllers 170 to calibrate the pressure drop per pulse of each fast pulsing valve 174. The pulse window for one or more of the fast pulsing valves 174 can be altered to compensate for differences in the individual orifices 172 and fast pulsing valves 174.

Figure 4:
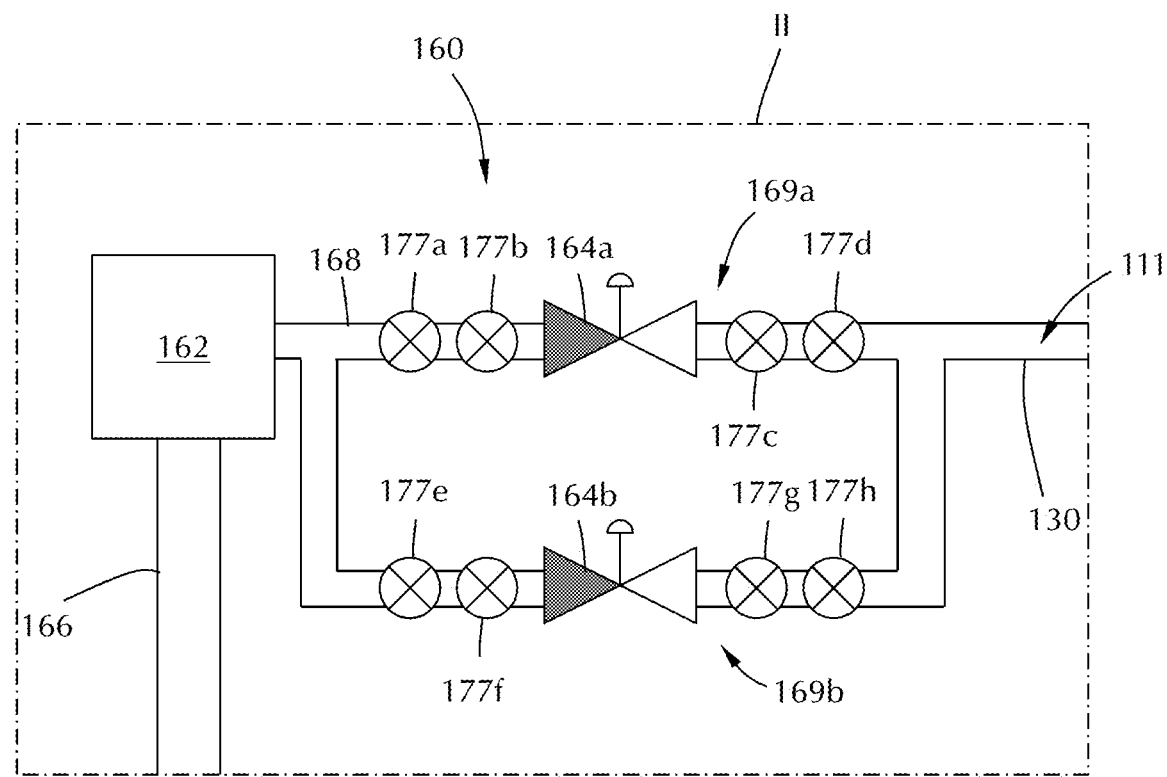
FIG. 4 shows an expanded view of region II of FIG. 1 according to one or more embodiment of the disclosure.

FIG. 4 illustrates another pressure controller 160 connected to the upstream end 111 of the shared volume 110. The illustration shows expanded view of region II of FIG. 1 according to another embodiment of the disclosure. In this embodiment, after the regulator 162 or mass flow controller, there are two flow paths 169a, 169b for the pressure control conduit 168. Each of the flow paths 169a, 169b has a fast pulsing valve 164a, 164b, respectively. The separate flow paths 169a, 169b can be isolated from each other by valves 177a-d, 177e-h, respectively to allow for the replacement of the fast pulsing valve 164a, 164b of one of the flow paths 169a, 169b without stopping any process being used. As will be understood by the skilled artisan, the dual valves on either side of the fast pulsing valves can be used to isolate the flow to one of the flow paths.

The gas distribution apparatus 100 of some embodiments further comprises a controller 190. The controller 190 may be coupled to various components of the gas distribution apparatus 100 to control the operation thereof. The controller 190 can be a single controller that controls the apparatus, or multiple controllers that control individual portions of the apparatus. For example, the gas distribution apparatus 100 may include separate controllers for each of the pressure controller 160 and flow controller 170.

In some embodiments, the controller 190 includes a central processing unit, a memory, and support circuits. The controller 190 may control the gas distribution apparatus 100 directly, or via computers (or controllers) associated with particular process chamber and/or support system components. The controller 190 may be one of any form of general-purpose computer processor that can be used in an industrial setting for controlling various chambers and sub-processors. The memory or computer readable medium of the controller may be one or more of readily available memory such as random access memory (RAM), read only memory (ROM), floppy disk, hard disk, optical storage media (e.g., compact disc or digital video disc), flash drive, or any other form of digital storage, local or remote. The support circuits are coupled to the CPU 196 for supporting the processor in a conventional manner. These circuits include cache, power supplies, clock circuits, input/output circuitry and subsystems, and the like. One or more processes may be stored in the memory as software routine that may be executed or invoked to control the operation of the apparatus or individual components in the manner described herein. The controller 190 can include one or more configurations which can include any commands or functions to control flow rates, gas valves, gas sources or other processes for performing the various configurations.

The controller 190 can be connected to one or more of the pressure controller 160, the flow controller 170, the pressure gauge 150, the regulator 162, fast pulsing valve 164 or fast pulsing valve 174. The controller 190 can have one or more configurations. In some embodiments, the controller 190 has a configuration to open and/or close one or more of the fast pulsing valves 164, 174. In some embodiments, the controller 190 has a configuration to monitor pressure using the pressure gauge 150. In some embodiments, the controller 190 has a configuration to control regulator 162. In some embodiments, the controller 190 has a configuration to calibrate the flow controllers 170.

Some embodiments of the disclosure are directed to processing platform. For example, the embodiment illustrated in FIG. 1 can be considered a processing platform with three process chambers (processing stations 101). Each process station 101 is connected to one flow controller 170 at the downstream end of the shared volume 110 through a downstream gas conduit 180.

While the foregoing is directed to embodiments of the present disclosure, other and further embodiments of the disclosure may be devised without departing from the basic scope thereof, and the scope thereof is determined by the claims that follow.

What is claimed is:

1. A gas distribution apparatus comprising:
    a shared volume having an upstream end and a plurality of downstream ends;
    a pressure gauge connected to the shared volume;
    a pressure controller connected to the upstream end of the shared volume; and
    a flow controller at each of the downstream ends of the shared volume, each flow controller comprising an orifice and a fast pulsing valve; and
    a controller connected to the pressure gauge and each flow controller and configured to calibrate at least one of the flow controllers based on feedback from the pressure gauge before and after opening the at least one of the flow controllers a predetermined number of times.

2. The gas distribution apparatus of claim 1, wherein the shared volume comprises a gas reservoir, distribution lines from the gas reservoir to the plurality of downstream ends of the shared volume and distribution lines from the upstream end of the shared volume to the gas reservoir.

3. The gas distribution apparatus of claim 2, wherein the pressure gauge is configured to measure the pressure in the gas reservoir.

4. The gas distribution apparatus of claim 1, wherein the pressure controller comprises one or more of a regulator or mass flow controller.

5. The gas distribution apparatus of claim 1, wherein the pressure controller comprises a fast pulsing valve between a regulator and the shared volume.

6. The gas distribution apparatus of claim 1, further comprising a downstream gas conduit connected to a downstream end of each flow controller.

7. The gas distribution apparatus of claim 6, wherein the orifice comprises a restrictor to restrict a flow of gas from the downstream ends.

8. The gas distribution apparatus of claim 6, wherein the flow rate of gas exiting any of the flow controllers into the downstream gas conduit is a function of the difference in pressure downstream of the orifice in the downstream gas conduit from the pressure upstream of the orifice.

9. The gas distribution apparatus of claim 8, wherein the pressure upstream of the orifices is substantially the same for each downstream end of the shared volume.

10. The gas distribution apparatus of claim 6, wherein pressure perturbations in each downstream gas conduit is less than or equal to ±2%.

11. The gas distribution apparatus of claim 1, wherein the fast pulsing valve of the flow controller is configured to open or close with 50 milliseconds.

12. The gas distribution apparatus of claim 1, wherein a volume between the orifice and the fast pulsing valve is minimized.

13. The gas distribution apparatus of claim 1, wherein the fast pulsing valve of the flow controller is downstream of the orifice.

14. The gas distribution apparatus of claim 1, wherein the fast pulsing valve of the flow controller is upstream of the orifice.

15. The gas distribution apparatus of claim 1, wherein the controller has one or more configurations selected from a first configuration to control the pressure controller; and a second configuration to open and close the fast pulsing valves of the flow controller on at least one downstream end of the shared volume.

16. A processing platform comprising a plurality of processing chambers, each chamber connected to one flow controller at the downstream end of the shared volume through a downstream gas conduit of the gas distribution apparatus of claim 1.

17. A gas distribution apparatus comprising:

a shared volume having an upstream distribution line with an upstream end, a gas reservoir and a plurality of downstream distribution lines, each downstream distribution line having a downstream end;

a pressure gauge connected to the shared volume;

a pressure controller connected to the upstream end of the shared volume, the pressure controller comprising a fast pulsing valve between a regulator and the shared volume, the fast pulsing valve configured to open or close within 50 milliseconds;

a flow controller at each of the downstream ends of the shared volume, each flow controller comprising an orifice and a fast pulsing valve, the pressure upstream of each of the orifices of the flow controllers are substantially the same;

a downstream gas conduit connected to and in fluid communication with and downstream of the flow controller; and a controller having one or more configurations selected from a first configuration to control the pressure controller; a second configuration to open and close the fast pulsing valves of the flow controller on at least one downstream end of the shared volume, the controller configured to calibrate at least one of the flow controllers based on feedback from the pressure gauge before and after opening the at least one of the flow controllers a predetermined number of times.

18. The gas distribution apparatus of claim 17, wherein the flow rate of gas exiting any of the flow controllers into the downstream gas conduit is a function of the difference in pressure downstream of the orifice in the downstream gas conduit from the pressure upstream of the orifice.

* * * * *